United States Patent
Pandit et al.

(10) Patent No.: US 12,413,494 B1
(45) Date of Patent: Sep. 9, 2025

(54) METHODS AND SYSTEMS FOR HEALING REMOTE SITE DEVICES BASED ON MONITORED HEALTH METRICS

(71) Applicant: CVS Pharmacy, Inc., Woonsocket, RI (US)

(72) Inventors: Vanteya Pandit, North Attleboro, MA (US); Bhupendra Kothari, Louisville, KY (US); Sean Mayhew, Live Oak, FL (US); Anil Kumar Madathil, Louisville, KY (US)

(73) Assignee: CVS PHARMACY, INC., Woonsocket, RI (US)

( * ) Notice: Subject to any disclaimer, the term of this patent is extended or adjusted under 35 U.S.C. 154(b) by 7 days.

(21) Appl. No.: 18/596,165

(22) Filed: Mar. 5, 2024

(51) Int. Cl.
  *H04L 43/0817* (2022.01)
  *H04L 41/22* (2022.01)
(52) U.S. Cl.
  CPC .......... *H04L 43/0817* (2013.01); *H04L 41/22* (2013.01)
(58) Field of Classification Search
  CPC ........................... H04L 43/0817; H04L 41/22
  See application file for complete search history.

(56) References Cited

U.S. PATENT DOCUMENTS

| | | | |
|---|---|---|---|
| 12,211,596 B2 * | 1/2025 | Burton | G16H 10/60 |
| 2005/0198040 A1 * | 9/2005 | Cohen | H04L 12/2838 |
| 2010/0131638 A1 * | 5/2010 | Kondamuru | G06F 9/5083 709/224 |
| 2012/0246305 A1 * | 9/2012 | Vedula | H04L 41/0233 709/224 |
| 2016/0043814 A1 * | 2/2016 | Bishop | H04L 43/06 370/242 |

\* cited by examiner

*Primary Examiner* — Benjamin M Thieu
(74) *Attorney, Agent, or Firm* — Sheridan Ross PC

(57) ABSTRACT

A system, method, and apparatus are provided that include: receiving data corresponding to an operability status for each remote site of a plurality of remote sites, converting the data received into a structured data array for each remote site, storing the structured data array for each remote site into a respective group storage location, determining a state of health for each remote site based on the structured data array, generating a first dashboard user interface comprising site identifiers representing each remote site and the state of health for each remote site, rendering the first dashboard user interface via a display device, receiving a user interface selection of a select identifier of the site identifiers corresponding to a select remote site of the plurality of remote sites, and rendering a second dashboard user interface for the select remote site via the display device.

20 Claims, 8 Drawing Sheets

| | Identifier | Rank | State of Health |
|---|---|---|---|
| 605-c | Remote Site 101-c | 1 | 99% |
| 605-a | Remote Site 101-a | 2 | 85% |
| 605-b | Remote Site 101-b | 3 | 50% |

Remote Site 101-b

State of Health:
- Calculated Health 625 — 50%
- Predicted Future Health 630 — 35%
- Predicted Failure(s) 635
- Temporal Information 640

(615)

Operability Status(es):
- Network Status 621
- Device Status(es) 622
- Environmental Condition 623

(620)

601

*Fig. 6B*

METHODS AND SYSTEMS FOR HEALING REMOTE SITE DEVICES BASED ON MONITORED HEALTH METRICS

FIELD OF THE DISCLOSURE

The disclosure relates to systems and methods for monitoring health metrics of remote site devices, and more particularly to systems and methods for healing remote site devices based on the monitored health metrics.

BACKGROUND

In some system environments, hardware/system issues at remote sites may result in system downtime and lost productivity. Techniques for reducing the number of tickets being sent to a help desk in relation to hardware/system issues at remote sites are desired.

SUMMARY

A server including a processor and memory storing instructions coupled with and readable by the processor. The instructions, when executed by the processor, cause the processor to: receive, from a plurality of remote sites, data corresponding to an operability status for each remote site of the plurality of remote sites, wherein the operability status includes a network status for each remote site of the plurality of remote sites, a device status for at least one device at each remote site, and an environmental condition associated with each remote site; convert the data received into a structured data array for each remote site, wherein the structured data array includes the data received arranged by a name-specific format that identifies whether the data is associated with the network status, the device status, and the environmental condition; store, in a memory storage device, the structured data array for each remote site into a respective group storage location; determine, based on the structured data array, a state of health for each remote site; generate a first dashboard user interface including site identifiers representing each remote site of the plurality of remote sites and the state of health for each remote site; generate a second dashboard user interface for each remote site including discrete user interface icons for each of the network status, the device status, and the environmental condition for each remote site; render, via a display device, the first dashboard user interface including the site identifiers; receive, via a user interface device, a user interface selection of a select identifier of the site identifiers corresponding to a select remote site of the plurality of remote sites; and render, via the display device in response to receiving the user interface selection, the second dashboard user interface for the select remote site of the plurality of remote sites.

Any of the aspects herein, wherein the instructions that, when executed by the processor, further cause the processor to: determine, based on the state of health for a particular remote site of the plurality of remote sites, a service is required for the at least one device at the particular remote site; send, across a communication network, a service request message to a service server; and receive, from the service server, a confirmation message that the service request message is received and that a service ticket is created for the at least one device at the particular remote site.

Any of the aspects herein, wherein the instructions that, when executed by the processor, further cause the processor to dispatch, in response to receiving the confirmation message, a service technician to the particular remote site within a predetermined time limit.

Any of the aspects herein, wherein the data is received from the plurality of remote sites simultaneously and in real time.

Any of the aspects herein, wherein the data includes error log information and event message information from the at least one device at each remote site.

Any of the aspects herein, wherein the state of health includes an operability of the at least one device at each remote site over time.

Any of the aspects herein, wherein the instructions that, when executed by the processor, further cause the processor to: determine, based on the state of health for each remote site, whether at least one remote site includes at least one of a faulty network status including a network transmission status that falls below a predetermined transmission value, a faulty device status including a device operation statistic that falls below a predetermined operation value, and a faulty environmental condition including an environmental status that falls outside of a predetermined environmental range.

Any of the aspects herein, wherein the at least one of the faulty network status, faulty device status, and the faulty environmental condition corresponds to a predictive trigger for a failure of at least one remote site before the failure occurs.

Any of the aspects herein, wherein the instructions that, when executed by the processor, further cause the processor to: provide the data received to a machine learning network; receive an output from the machine learning network in response to the machine learning network processing at least a portion of the data received; and update the structured data array based on data included in the output from the machine learning network, wherein determining the state of health for each remote site is based on updating the structured data array.

Any of the aspects herein, wherein the output from the machine learning network includes at least one of: a predicted network status for at least one remote site of the plurality of remote sites; a predicted device status for at least one device at the at least one remote site; a predicted environmental condition associated with the at least one remote site; and a predicted operability status for the at least one remote site.

Any of the aspects herein, wherein the output from the machine learning network includes: a predicted failure associated with a remote site of the plurality of remote sites; and a failure point associated with the predicted failure and the remote site.

A system, including: a communications interface; a processor coupled with the communications interface; and a memory coupled with the processor. The memory stores data that, when executed by the processor, enables the processor to: receive, from a plurality of remote sites, data corresponding to an operability status for each remote site of the plurality of remote sites, wherein the operability status includes a network status for each remote site of the plurality of remote sites, a device status for at least one device at each remote site, and an environmental condition associated with each remote site; convert the data received into a structured data array for each remote site, wherein the structured data array includes the data received arranged by a name-specific format that identifies whether the data is associated with the network status, the device status, and the environmental condition; store, in a memory storage device, the structured data array for each remote site into a respective group storage location; determine, based on the structured data array, a state of health for each remote site; generate a first dashboard user interface for each remote site including site identifiers representing each remote site of the plurality of remote sites and the state of health for each remote site; generate a second dashboard user interface including discrete user interface icons for each of the network status, the device status, and the environmental condition for each remote site; render, via a display device, the first dashboard user interface including the site identifiers; receive, via a user interface device, a user interface selection of a select identifier of the site identifiers corresponding to a select remote site of the plurality of remote sites; and render, via the display device in response to receiving the user interface selection, the second dashboard user interface for the select remote site of the plurality of remote sites.

Any of the aspects herein, wherein the data that, when executed by the processor, further cause the processor to: determine, based on the state of health for a particular remote site of the plurality of remote sites, a service is required for the at least one device at the particular remote site; send, across a communication network, a service request message to a service server; and receive, from the service server, a confirmation message that the service request message is received and that a service ticket is created for the at least one device at the particular remote site.

Any of the aspects herein, wherein the data that, when executed by the processor, further cause the processor to dispatch, in response to receiving the confirmation message, a service technician to the particular remote site within a predetermined time limit.

Any of the aspects herein, wherein: the data includes error log information and event message information from the at least one device at each remote site; and the state of health includes an operability of the at least one device at each remote site over time.

Any of the aspects herein, wherein the data that, when executed by the processor, further cause the processor to: determine, based on the state of health for each remote site, whether at least one remote site includes at least one of a faulty network status including a network transmission status that falls below a predetermined transmission value, a faulty device status including a device operation statistic that falls below a predetermined operation value, and a faulty environmental condition including an environmental status that falls outside of a predetermined environmental range.

Any of the aspects herein, wherein the data that, when executed by the processor, further cause the processor to: provide the data received to a machine learning network; receive an output from the machine learning network in response to the machine learning network processing at least a portion of the data received; and update the structured data array based on data included in the output from the machine learning network, wherein determining the state of health for each remote site is based on updating the structured data array A method including: receiving, from a plurality of remote sites, data corresponding to an operability status for each remote site of the plurality of remote sites, wherein the operability status includes a network status for each remote site of the plurality of remote sites, a device status for at least one device at each remote site, and an environmental condition associated with each remote site; converting the data received into a structured data array for each remote site, wherein the structured data array includes the data received arranged by a name-specific format that identifies whether the data is associated with the network status, the device status, and the environmental condition; storing, in a memory storage device, the structured data array for each remote site into a respective group storage location; determining, based on the structured data array, a state of health for each remote site; generating a first dashboard user interface including site identifiers representing each remote site of the plurality of remote sites and the state of health for each remote site; generating a second dashboard user interface for each remote site including discrete user interface icons for each of the network status, the device status, and the environmental condition for each remote site; rendering, via a display device, the first dashboard user interface including the site identifiers; receiving, via a user interface device, a user interface selection of a select identifier of the site identifiers corresponding to a select remote site of the plurality of remote sites; and rendering, via the display device in response to receiving the user interface selection, the second dashboard user interface for the select remote site of the plurality of remote sites.

Any of the aspects herein, further including: determining, based on the state of health for a particular remote site of the plurality of remote sites, a service is required for the at least one device at the particular remote site; sending, across a communication network, a service request message to a service server; and receiving, from the service server, a confirmation message that the service request message is received and that a service ticket is created for the at least one device at the particular remote site.

Any of the aspects herein, further including: determining, based on the state of health for each remote site, whether at least one remote site includes at least one of a faulty network status including a network transmission status that falls below a predetermined transmission value, a faulty device status including a device operation statistic that falls below a predetermined operation value, and a faulty environmental condition including an environmental status that falls outside of a predetermined environmental range.

All aspects, examples, and features mentioned above can be combined in any technically possible way.

BRIEF DESCRIPTION OF THE DRAWINGS

The present disclosure is described in conjunction with the appended figures, which are not necessarily drawn to scale:

FIGS. 6A and 6B illustrate example user interfaces in accordance with aspects of the present disclosure.

DETAILED DESCRIPTION

Figure 1:
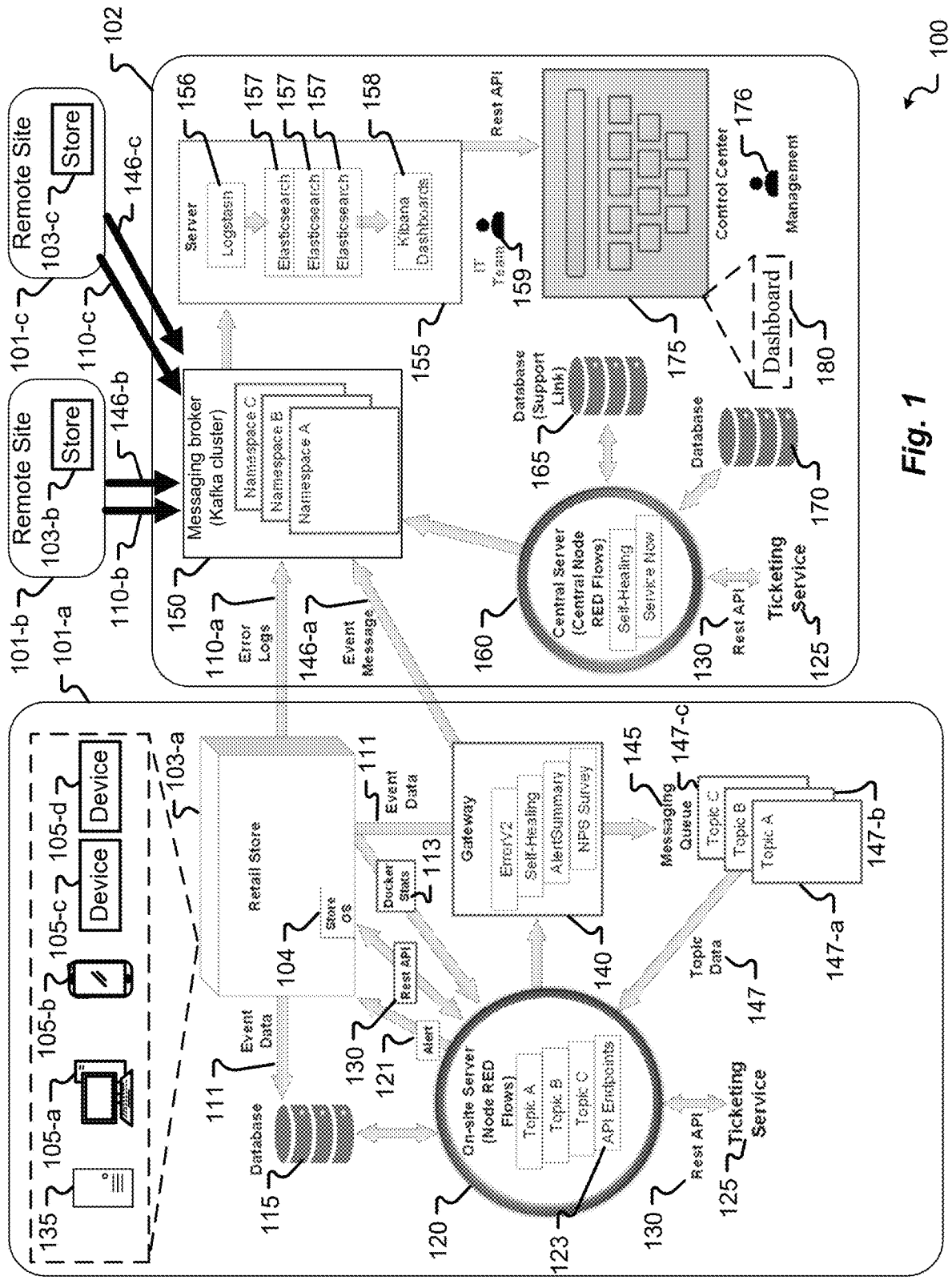
FIG. 1 illustrates an example of a system in accordance with aspects of the present disclosure.

Before any examples of the disclosure are explained in detail, it is to be understood that the disclosure is not limited in its application to the details of construction and the arrangement of components set forth in the following description or illustrated in the following drawings. The disclosure is capable of other configurations and of being practiced or of being carried out in various ways. Also, it is to be understood that the phraseology and terminology used herein is for the purpose of description and should not be regarded as limiting.

While various examples will be described in connection with remote sites associated with retail stores, it should be appreciated that the disclosure is not so limited. For instance, it is contemplated that examples of the present disclosure can be applied to any system that supports monitoring techniques (e.g., device monitoring systems, remote site monitoring systems, network monitoring systems, etc.).

In some retail environments, hardware/system issues in retail stores may result in system downtime and lost productivity. Techniques for reducing the number of tickets being sent to a help desk for the retail stores in relation to hardware/system issues are desired.

A system according to aspects of the present disclosure may monitor raw data being sent from various devices (e.g., point of sale systems, printers, etc.), networks, and products associated with retail stores. The system may process the raw data through various algorithms (e.g., using a rules engine, using machine learning/AI, etc.) to predict likely failure points for each retail store. In some aspects, the system may automatically create alerts and/or help desk tickets to fix aspects of the system in advance of a larger issue arising. In some aspects, such addressing of aspects and issues in advance may be associated with a "self-healing" phase implemented by the system. In some other aspects, from data acquired by processing the raw data, the system may monitor site reliability engineering metrics to measure the "health" of each retail store. In some examples, the "health" of each retail store may include predicted failure points (e.g., failure of a device, failure of a network, etc.) and temporal information associated with the failure points (e.g., when a failure may occur).

Aspects of the present disclosure support implementing the techniques described herein at a point of sale system. For example, in some retail stores, point of sale hardware may be using older technology provided by a vendor, and the internal software of the point of sale hardware is a black box from the perspective of the retail stores. In the case of a failure at the point of sale hardware, personnel at the retail store may have to reach out to the vendor for service (e.g., submit a service ticket), and the point of sale hardware may be unavailable until manually rebooted by the vendor.

According to example aspects of the present disclosure, a system is described herein that supports leveraging engineering metrics and data to identify patterns associated with devices (e.g., point of sale hardware, printers, etc.), networks, and products associated with the retail stores. The system may support taking proactive intervention for addressing potential failures associated with the devices, thereby eliminating instances (or reducing the number of instances) in which a device (e.g., point of sale hardware, network device, etc.) reaches a failure state and has to be serviced or rebooted. For example, if the point of sale data from a particular store indicates a certain error is present in association with a device (e.g., point of sale hardware, network device, etc.), the system may automatically open a service ticket with a vendor associated with the device, requesting for the vendor to send a field technician to service the device (e.g., replace a drive within the machine). Aspects of the system may thereby reduce instances of downtime at a remote site, provide opportunities to schedule device maintenance before failures or reductions in performance actually occur, and minimize customer wait time associated with system or device maintenance.

The systems and techniques described herein may implement rules or predictive models running in the background to issue flags/alerts and automatically create service tickets. In some examples, the flags/alerts may indicate potential failures and/or actual failures associated with devices of a system. In some aspects, in addition to leveraging the internal data from hardware and networks associated with a retail store system, the systems and techniques described herein may leverage external or third party data. A non-limiting example of third party data includes data indicating if there is an internet provider outage (e.g., a FIOS outage) in a specific retail store. As described herein, aspects of the present disclosure support gathering data to train predictive models, implementing "self-healing" measures that may process and act on the gathered data (e.g., identify potential failures and/or actual failures), and downstream process flows (e.g., automatically opening a service ticket for identified failures).

The systems and techniques described herein bring visibility in gathering site reliability engineering (SRE) Metrics. The systems and techniques provide a reusable framework that supports gaining insights by running a query (or multiple queries) to understand the metrics, providing alerts, and self-healing. In some examples, aspects of the systems and techniques ensure automatically providing notifications for any issues across any store (e.g., retail store) automatically, and in some examples, faster turnaround to fix such issues. In some aspects, the systems and techniques support creating dashboards where the health of each store is monitored and service tickets are created without manual intervention.

Aspects of the present disclosure may thereby, for example, provide a reduction in reducing the number or frequency of service tickets, reducing the number or frequency of help-desk calls, increased visibility (e.g., increased visibility of potential failures, increased visibility of system/device/network health, etc.), and cost savings. In some aspects, the systems and techniques described herein may support modifications and enhancements by a scoring metric (e.g., a net promotor score (NPS)) in which colleagues may provide feedback.

The systems and techniques described herein support tracking, measurement, and improvement (TMI) patterns. For example, the techniques described herein provide NPS, self-healing, and SRE telemetry that is scalable to handle future needs both centrally (e.g., by a central system monitoring multiple retail stores (remote sites)) and locally (e.g., through system monitoring at the retail store level). The functionalities supported by the systems and techniques described herein may include creating tickets automatically and may reduce manual dependency when an issue (e.g., a detected failure, a predicted failure, etc.) arises. In some aspects, the techniques described herein include measuring colleague experience through gathering actionable feedback.

In some examples, the systems and techniques support handling information by adding namespace/actionable events. For example, techniques described herein include acquiring data (e.g., device data, retail store data, error log information, event message information, etc.) via a gateway. In some aspects, acquiring the data may be implemented with the assistance of a search and analytics engine (e.g., Elasticsearch, etc.), a server-side data processing pipeline (e.g., Logstash, etc.) that ingests data from multiple sources simultaneously, transforms the data, and sends the data to a "stash" (e.g., Elasticsearch), and data visualization (e.g., Kibana, etc.) with charts and graphs. The combination of Elasticsearch, Logstash, and Kibana may be referred to as 'ELK.'

The techniques described herein may include implementations using a programming tool (e.g., Node RED, etc.) for connecting hardware devices, APIs, and online services. In some aspects, the systems and techniques may include implementations using reusable components and may be extensible to master data. A user interface of the system supports aspects described herein of leveraging engineering metrics and data.

The systems and techniques may provide root cause analysis that provides relatively quick detection of network hardware/software issues, thereby addressing problems associated with other systems. For example, the leveraging of engineering metrics and rules/predictive models may achieve a lower mean time to resolution (MTTR) (e.g., in the event of a failure or a predicted failure) and provide high-quality colleague experience and customer satisfaction (e.g., field technician service (FTS) time is saved).

The systems and techniques support continuous improvement and self-healing. For example, aspects of the present disclosure may support training and retraining of machine learning models based on prior predictions and prior actions (e.g., repairs and/or replacement of devices, networks, etc.), a unique ability to gather NPS from users, and techniques described herein of tracking, measuring, and improvement. In some examples, machine learning applications supported by the present disclosure include automatically detecting anomalies and identifying outliers, performing trend forecasting across multiple remote sites (e.g., across all stores monitored by the system), and identifying areas of interest within collected data-topics.

Although some example implementations described herein are described with reference to a point of sale system, it is to be understood that the example implementations are not limited thereto. For example, the systems and techniques described herein may support implementations applied to any system (e.g., device monitoring systems, remote site monitoring systems, network monitoring systems, etc.) in association with gathering SRE metrics, identifying TMI patterns, continuous improvement, self-healing, and any of the machine learning aspects described herein.

Example aspects of the present disclosure are described with reference to the following figures.

FIG. 1 illustrates an example system 100 in accordance with aspects of the present disclosure.

Referring to FIG. 1, the system 100 may include remote sites 101 (e.g., remote site 101-*a*, remote site 101-*b*, remote site 101-*c*, etc.) and a central node 102. Each remote site 101 may correspond to a geographical location including one or more stores 103 (also referred to herein as physical retail stores or retail stores). For example, remote site 101-*a* may correspond to a geographical location including a store 103-*a*. In an example, remote site 101-*a* may include a store 103-*a*, one or more servers 135, and one or more devices 105 (e.g., device 105-*a*, device 105-*b*, etc.).

Devices 105 may be referred to as computing devices or communication devices. In some examples, a device 105 (e.g., device 105-*a*, device 105-*b*, etc.) may include point of sale hardware, network devices, portable computing devices, and other devices associated with the store 103. Example aspects of the devices 105 are later described with reference to FIG. 7.

Aspects of the present disclosure may support implementations of any quantity of remote sites 101 and any quantity of stores 103 (e.g., $10^4$ stores 103). Aspects described herein with reference to the remote sites 101 and the central node 102 may be implemented by a servers (e.g., on-site servers 120, servers 135, central servers 160, servers 155, etc.) respective to the remote sites 101 and the central node 102. Example aspects of the servers are later described herein.

The system 100 may include a communication network that facilitates machine-to-machine communications between devices associated with the remote sites 101 and devices associated with the central node 102. Devices described herein at each of the remote sites 101 may communicate over the communication network. Devices described herein at the central node 102 may communicate over the communication network. Example aspects of the communication network are later described with reference to FIG. 7.

Aspects of the present disclosure provide a platform capable of interfacing with stores 103 (e.g., over 10,000 stores 103). In an example, each store 103 may host servers (e.g., server 135) that may collect and send event data 111 from multiple devices 105 and products via docker containers (e.g., docker containers 310 later described with reference to FIG. 3). Aspects described herein as implemented in association with a store 103 (e.g., store 103-*a*, store 103-*b*, etc.) may be implemented by a device 105 (e.g., computing device(s)) associated with the store 103 or a server (e.g., on-site server 120, server 135, etc.) hosted at the store 103.

Each server 135 may store event data 111 in a database 115. The server 135 may send the event data 111 to a gateway 140 of the remote site 101 for processing, automated ticketing, and SRE monitoring. In an example, the database 115 may be a general purpose database (e.g., Postgres database) used by the store 103 for recording event data 111 and response data.

The server 135 may send docker statistics 113 to an on-site server 120 (e.g., a Node RED server) (also referred to herein as a node). In some examples, the docker statistics 113 may include runtime metrics (e.g., CPU, memory usage, memory limit, network IO metrics, etc.) associated with a container. The server 135 may send error logs 110-*a* to a messaging broker 150 located off-site from the remote site 101. In an example, the messaging broker 150 may be local to the central node 102. The messaging broker 150 may include multiple high throughput and lossless publish-subscribe messaging brokers. For example, the messaging broker 150 may be an off-site Kafka cluster. The messaging broker 150 may process streaming data (e.g., event messages 146) from the gateway 140 and error logs 110 from each store 103.

In some non-limiting examples, any of the devices 105 may receive an alert(s) 121 from on-site server 120 (e.g., Node RED), and the store OS 104 may interface with API endpoints 123 (e.g., Node RED API endpoints) of the on-site server 120.

The on-site server 120 may implement a messaging queue 145 (also referred to herein as a messaging queue portal) that supports the communication of data (e.g., in-store device data) of devices 105 of the store 103, ticketing data associated with a ticketing system 125, and data stored at the database 115. For example, the on-site server 120 may support the exchange of data between devices 105, store OS 104, ticketing system 125, and the database 115.

The ticketing system 125 may support automated issue ticking and ticket resolution. For example, the ticketing system 125 may include an IT service management (ITSM) framework. In some examples, the ticketing system 125 may be a tool capable of tracking IT service requests, events, incidents, and alerts associated with the store 103.

The gateway 140 may include a collection of messaging APIs that support ticket-automation, tracking NPS, and generating a holistic view of the health of the store 103. The health may include an indication of network status for the store 103 and device statuses (e.g., of the devices 105, the server 135, etc.).

Messaging queue 145 may be a lossless and asynchronous TCP/IP messaging queue that supports the communication of topics 147 (e.g., current topics, new topics, etc.) to embedded devices. Messaging queue 145 may support an MQTT (Message Queuing Telemetry Transport) messaging protocol for transmitting messages between devices and clouds. The MQTT messaging protocol may interconnect everything in an Internet of everything (IoE) architecture.

Representational state transfer application programming interface (REST API) 130 may support defining constraints for creating web services associated with the system 100. REST API 130 may support enabling communication between different software systems over the communication network. REST API 130 may support exposing resources. Each resource may represent an object, a collection of objects, or any other entity in the application.

Referring to central node 102, server 155 may store, search, analyze, and visualize incoming data topics. In an example, server 155 may be an Elasticsearch, Logstash, Kibana (ELK) server including a distributed search and analytics engine 157 (e.g., Elasticsearch), an aggregator pipeline 156 (e.g., Logstash), and a dashboard 158 (e.g., Kibana dashboard), example aspects of which are later described herein.

Central server 160 (also referred to herein as central Node RED) may implement a central messaging queue portal that supports the communication of data between database 165, ticketing system 125, and database 170. Database 165 may be an external support database (e.g., a support link database), and database 170 may be a general purpose database (e.g., a Postgres database) that is a central database of the system 100. Control center 175 may support the generation of site reliability engineering (SRE) metrics and queries across all remote sites 101 and all stores 103. Control center 175 may be implemented at a computing device at the central node 102. In some aspects, the control center 175 may be accessed via and implemented at a computing device (e.g., device 105-*a*, device 105-*b*, server 135, etc.) at a remote site 101. Aspects described herein as implemented in association with the central node 102 may be implemented by components (e.g., messaging broker 150, server 155, central server 160, control center 175, etc.) included at the central node 102.

According to example aspects of the present disclosure, the central node 102 may receive, from remote sites 101 (e.g., remote site 101-*a*, remote site 101-*b*, etc.), data corresponding to an operability status for each remote site 101. In some aspects, for each remote site 101 (e.g., remote site 101-*a*), the operability status includes a network status for the remote site 101. In some aspects, the operability status includes device statuses for devices 105 at the remote site 101. The device status of a device 105 may include a device operation statistic (e.g., performance statistic, performance measurement, predicted performance, etc.) of the device 105. For example, the device status may be a 'faulty device status' for cases in which the device operation statistic falls below a predetermined operation value. In another example, the device status may be a 'non-faulty device status' for cases in which the device operation statistic is greater than or equal to the predetermined operation value.

In some other aspects, the operability status includes an environmental condition associated with the remote site 101. The environmental condition may be a 'faulty environmental condition' for cases in which the environmental status falls outside of a predetermined environmental range (e.g., is outside of boundaries of the predetermined environmental range). In another example, the environmental condition may be a 'non-faulty environmental condition' for cases in which the environmental status is inside of the predetermined environmental range (e.g., is within boundaries of the predetermined environmental range).

The central node 102 may receive the data corresponding to operability statuses from multiple remote sites 101 simultaneously and in real time. In some examples, the data may include error log information (e.g., error logs 110-*a*, error logs 110-*b*, etc.) and event message information (e.g., event messages 146-*a*, event messages 146-*b*, etc.). In some other aspects, the central node 102 may receive the data from multiple remote sites 101 at different respective times or based on trigger criteria. In some other aspects, the central node 102 may receive or retrieve historical data (e.g., operability statuses, network statuses, device status, environmental statuses, event data 111, error logs 110, event messages 146, etc.) associated with one or more remote sites 101. In an example, the central node 102 may receive or retrieve the historical data from a database (e.g., database 115, database 170, etc.), a server (e.g., on-site server 120, server 135, etc.), or device 105 associated with the system 100.

The central node 102 may convert the data into a structured data array for each remote site 101. In some example implementations, the structured data array may be implemented at a messaging broker 150 (also referred to herein as a messaging broker cluster) (e.g., Kafka cluster) described herein. The structured data array may include the received data, arranged by a name-specific format (e.g., Namespace A corresponding to 'network status,' Namespace B corresponding to 'device status,' Namespace C corresponding to 'environmental condition,' etc.). In an example, based on the name-specific format, the data may be identified by the central node 102 as being associated with any of the operability statuses (e.g., network status, device status, environmental condition, etc.) described herein. The central node 102 may store the structured data array for each remote site 101 into a respective group storage location included in a database (e.g., database 170).

The central node 102 may determine a state of health for each remote site 101 from the structured data array. The state of health may include an operability of the at least one device 105 at each remote site 101 with respect to a temporal instance or temporal period. In some examples, the operability may include a device status of the device 105 as described herein. In some other aspects, for the case of a device 105 (e.g., device 105-*d*) that is a networking device having one or more states (e.g., functional device state, faulty device state, etc.), the operability may include a network status (e.g., online, offline, network performance below a threshold value, network performance above the threshold value, etc.) of the device 105. In some other examples, the operability of a remote site 101 may include a network status that includes a network transmission status (e.g., data transmission rate above a threshold value, data transmission rate below the threshold value, etc.) between the remote site 101 and the central node 102.

According to example aspects of the present disclosure, based on state of health (e.g., operability described herein) and the structured data array, the central node 102 may predict a failure associated with any remote site 101 and temporal information associated with the failure prediction, before the failure occurs. For example, based on the state of health for a remote site 101, the central node 102 may identify the presence of a predictive trigger for failure at a remote site 101. The predictive trigger may include any of a faulty network status, a faulty device status, and a faulty environmental condition described herein. Based on the state of health and the identification of the predictive trigger (e.g., faulty network status, faulty device status, faulty environmental condition, etc.), the central node 102 may determine that service is required for one or more devices (e.g., a device 105, server 135, etc.) at the remote site 101.

The system 100 may support generating a service request message(s) (also referred to herein as a ticket request) and dispatching a service technician(s) to resolve the service request message(s). In an example, the on-site server 120 may send, across the communication network, a service request message to the ticketing system 125. The service request message may include an indication of a device 105 at the remote site 101. For example, the on-site server 120 may transmit the service request message to a service server associated with the ticketing system 125. In some aspects, the service request message may include a state of health of the device 105, a predicted failure associated with the device 105, or a combination thereof as described herein.

In response to the service request message, the ticketing system 125 may transmit a confirmation message to the on-site server 120. The confirmation message may indicate that the service request message has been received and that a service ticket has been created in association with the device 105 and the remote site 101. The ticketing system 125 may dispatch a service technician to the remote site 101-*a* in response to the service request message. In some other aspects, a server (e.g., server 135, on-site server 120, etc.) at the remote site 101 or a server (e.g., central server 160) at the central node 102 may dispatch the service technician. The system 100 may support dispatching a service technician autonomously or semi-autonomously (e.g., in combination with a user input).

The system 100 may support a control center 175 via which a user may view information associated with the remote sites 101, identify potential failures associated with the remote sites 101, and initiate service requests described herein. The control center 175 may be implemented at a computing device at the central node 102 and/or at a computing device (e.g., device 105-*a*) at a remote site 101. The control center 175 may display a dashboard 180 via which a user may view the information associated with the remote sites 101, identify the potential failures, and initiate service requests described herein. In some aspects, the dashboard 180 and user interfaces thereof may be implemented and rendered at a user interface (e.g., a display device, etc.) of a computing device at the central node 102 and/or a user interface at a computing device (e.g., a device 105) at a remote site 101.

In an example, the control center 175 may generate a first dashboard user interface (e.g., at dashboard 180) including site identifiers representing each remote site 101 and the state of health for each remote site 101. In some aspects, for each remote site 101, the control center 175 may generate a second dashboard user interface (e.g., at dashboard 180) including discrete user interface icons for each of the network status, the device status, and the environmental condition. The first dashboard user interface and the second dashboard user interface may support user analysis of any of the remote site 101. Example aspects of the first dashboard user interface and the second dashboard user interface are later described with reference to user interface 600 of FIG. 6A and user interface 601 of FIG. 6B, respectively.

The system 100 may support machine learning. In some example implementations, a machine learning network may be implemented at a server (e.g., server 135, on-site server 120, etc.) associated with the remote site 101, a server (e.g., central server 160) associated with the central node 102, or another server of the system 100. In an example, at each remote site 101, server 135 may provide data (e.g., device data, network data, error logs 110, alerts 121, event messages 146, etc.) associated with the remote site 101 to the machine learning network. In another example, the central server 160 may provide data (e.g., device data, network data, error logs 110, event messages 146, etc.) received from one or more remote sites 101 to the machine learning network.

In response to processing the data, the machine learning network may generate an output including predictions associated with the remote sites 101 and stores 103. Non-limiting examples of the predictions include: predicted network status for a remote site 101, a predicted device status one or more devices (e.g., device 105-*a*, server 135, etc.) at the remote site 101, a predicted environmental condition associated with the remote site 101, and a predicted operability status for the remote site 101. In some aspects, the output from the machine learning network may include a predicted failure associated with a remote site 101, a failure point (e.g., a device 105, a function or feature of the device 105, performance of the device 105, etc.) associated with the predicted failure, and temporal information associated with the predicted failure (e.g., an indication of a future temporal instance or temporal period associated with the predicted failure). The central node 102 may update the structured data array based at least in part on data included in the output from the machine learning network.

In some aspects, the machine learning network may provide the predictions described herein using machine learning models, rules engines, and the like. In some aspects, the output generated by the machine learning network may include probability scores and confidence scores associated with the predictions described herein. Example aspects of the machine learning network are later described herein.

Figure 2:
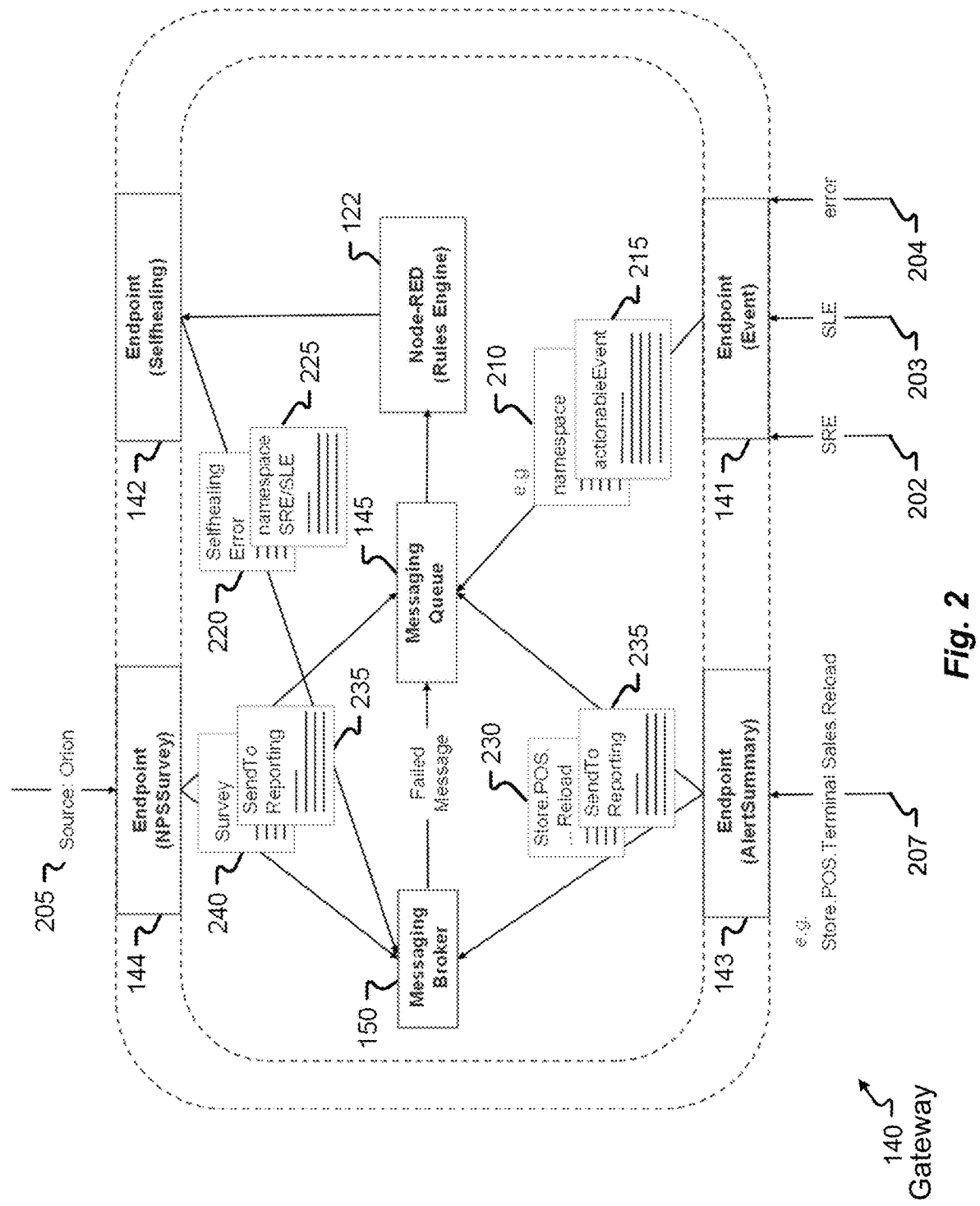
FIG. 2 illustrates an example of a gateway in accordance with aspects of the present disclosure.

Aspects of the present disclosure support technical improvements associated with monitoring techniques, failure prediction, and preemptive system or device maintenance. FIG. 2 illustrates an example of the gateway 140 in accordance with aspects of the present disclosure. FIG. 2 illustrates examples of endpoints (e.g., endpoint 141 through endpoint 144) associated with the gateway 140.

The gateway 140 may validate the namespace of a request payload 207 posted to the endpoint 143 ("AlertSummary"). In an example, if the namespace is "Store.Pos.TerminalSales.Reload," then the record associated with the namespace will be sent to the MQTT topic 230 ("Store.POS.TerminalSales.Reload"). In some examples, the request payload 207 may include an indication of health and/or stability for a system associated with the store 103-*a*. In an example, data included in the request payload 207 may indicate that the system associated with store 103-*a* has encountered issues or stability problems (e.g., crashed multiple times within a temporal period) but is still operational. In some other examples, data included in the request payload 207 may indicate that the system associated with store 103-a is stuck in a crash loop or has completely failed, rendering the system non-functional. Accordingly, for example, the system 100 may support determining the overall wellness or health of the system associated with store 103-a based on the frequency and severity of crashes.

The same record may also be posted to a broker topic ("AlertSummary") for an expedited register reload. Broker topics as described herein may be Kafka topics. Aspects of the present disclosure include posting all the records to the broker topic ("AlertSummary") and to the respective index associated with the broker topic in ELK.

If the request is not able to post the data to broker topic ("AlertSummary"), then the data will be sent to the broker topic 235 (e.g., MQTT topic) ("SendToReporting") with the response "201" Retry, and the record will retry based on a set of criteria (e.g., a trigger condition, for example, every 54 minutes) from an overflow table to the gateway 140. In an example, the overflow table may be implemented at the remote site 101. For example, the overflow table may be implemented at database 115.

The gateway 140 may support a set of valid event types. In some examples, the set of valid event types may include three valid eventTypes: system reliability engineering (SRE) posts 202 to Eventv2 eventType="SRE", system level engineering (SLE) posts 203 to EventV2 eventType="SLE", and error posts 204 to EventV2 eventType="error".

An example event (also referred to herein as a message or record) ("EventV2") associated with endpoint 141 is described herein. A request received will post the record based on the namespace 210 (<namespace>) and actionableEvent 215 (<actionableEvent>) to a topic 147 (e.g., an MQTT topic) associated with messaging queue 145, in which the topic name is "namespace/actionableEvent". The gateway 140 may send the record from messaging queue 145 to Node RED 122 based on the namespace 210 and actionableEvent 215 (namespace/actionableEvent).

The gateway 140 may validate a request received by EventType. In an example, if the EventType="error" (at 204), the entire record will be posted to the broker topic "Selfhealing". In another example, if the EventType="SRE" (at 202), the record will post the data to broker topic "the Namespace". In another example, if the EventType="SLE" (at 203), the record will post the data to broker topic "the Namespace".

The gateway 140 will validate the namespace of the request payload posted to the endpoint 143 ("AlertSummary"). In an example, if the namespace is "Store.Pos.TerminalSales.Reload," the record will be sent to the MQTT topic "Store.POS.TerminalSales.Reload." The same record will also be posted to broker topic "alertsummary" for an expedited register reload.

Aspects of the present disclosure include posting all the records posted to the broker topic "alertsummary" and to the respective index of the broker topic in ELK. If the request is not able to post the data to the broker topic "alertsummary", then the gateway 140 may send the request to the MQTT "SendToReporting" topic (at 235) with the response "201" retry, and the record will retry based on a set of criteria (e.g., a trigger condition, for example, every 54 minutes) from the overflow table to the gateway 140.

An example is described with reference to a request payload posted to an endpoint 144 (NPSSurvey) of the gateway 140. The gateway 140 will validate the JSON file for source 205: "Orion". If the gateway 140 identifies from the JSON file that the request payload does not exist (e.g., a message has not been sent, a message does not exist), the record will send the request to broker topic 235 ("SendToReporting"). If the gateway 140 identifies that the source 205 does exist (e.g., a message has been sent, a message does exist), the gateway 140 will post the request to the broker topic 240 ("Survey") with a success response and post the corresponding record to the respective index associated with the broker topic in ELK. In some aspects, the messaging queue 145 also sends the record to Node RED 122.

Node RED 122 may include a rules engine. Node RED 122 may be implemented at the on-site server 120 described herein. Node RED 122 will add the Product details and Source="Orion" to the record, and Node RED 122 may send the record to the overflow table. In an example, the overflow table may resend the record to the gateway 140.

If resending the record is successful, the record will be posted to broker topic 240 ("Survey") and to the respective index associated with the broker topic 240 in ELK. If resending the record is unsuccessful, and the request is unable to post the data to broker topic 240 ("Survey"), then Node RED 122 may send the record broker topic 235 ("SendToReporting") with the response "201" Retry, and the gateway 140 may retry to post the data to broker topic 240 ("Survey") based on a set of criteria (e.g., a trigger condition, for example, every 54 minutes).

Example messaging broker topics (e.g., Kafka topics) supported by the gateway 140 and the present disclosure include: Analytics→gateway 140 test, Selfhealing→app-SelfHealing, NPS→survey, NPStest→nps-test, Alertsummary→alertSummary, and sre.store.network.stats→SRE-StoreNetworkStats.

Example messaging queue 145 topics supported by the gateway 140 and the present disclosure include: paymentblock.error22→pos.paymentblock/E22, SRE→namespce/actionableEvent, reporting (NPS/AlertSummary)→SendToReporting, Datacapture→DataCaptureMQTT, and storePOSTerminalSalesReload→Store.POS.TerminalSales.Reload.

Figure 3:
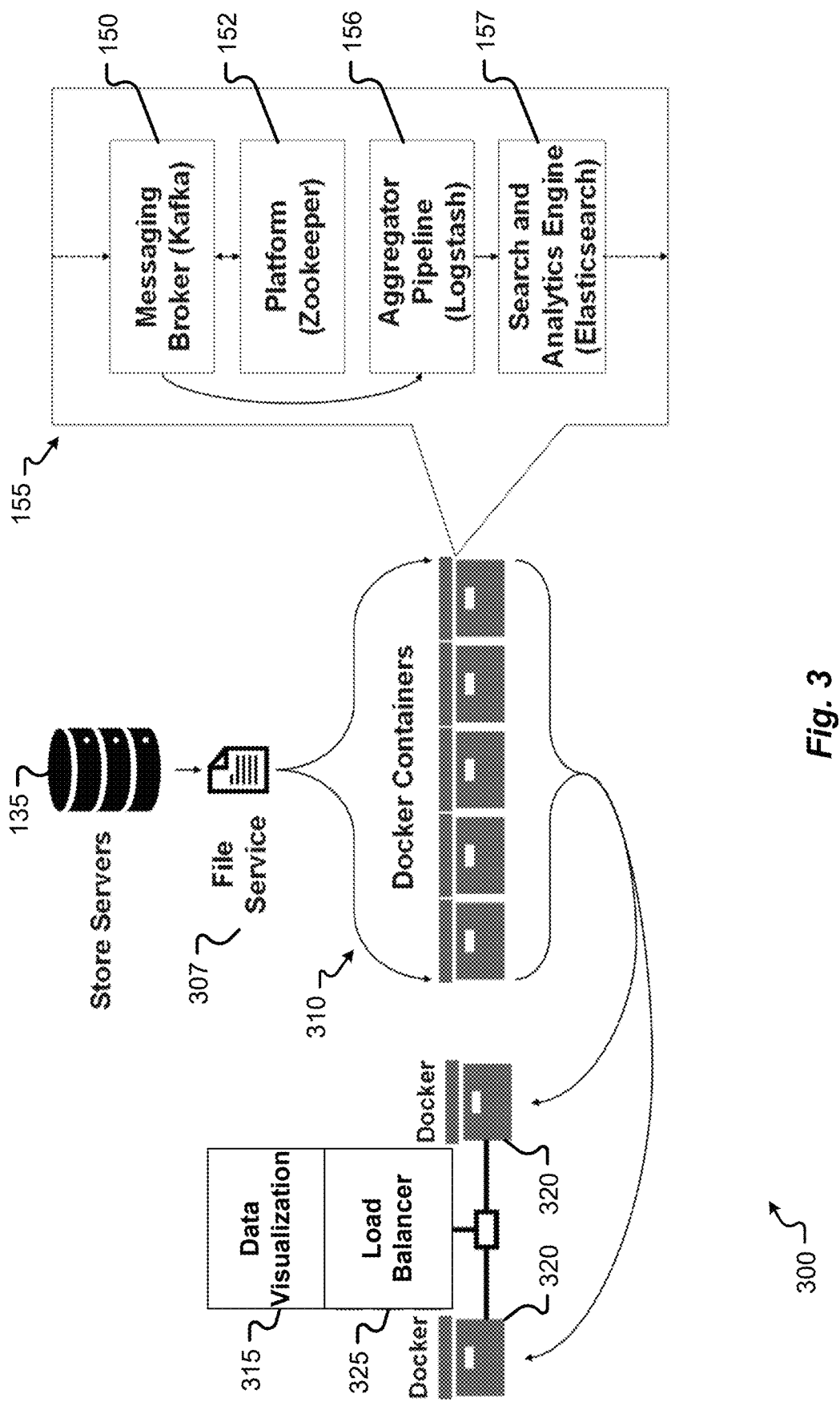
FIG. 3 illustrates an example system in accordance with aspects of the present disclosure.

FIG. 3 illustrates an example system 300 in accordance with aspects of the present disclosure. The system 300 may include aspects of the system 100 of FIG. 1. For example, servers 135 are associated with stores 103 as described herein. The server 155 may be an ELK (Elastic Search, Logstash, Kibana) server associated with the central node 102 and may support storing, searching, analyzing, and visualizing incoming data topics.

A file service 307 (e.g., FileBeat, etc.) may send store error log traffic (e.g., error logs 110) from servers 135 to an error log (e.g., Kafka error log, "store_error_log") of messaging broker 150. Docker containers 310 may support the development, shipment, and running of applications in an automated fashion. Messaging broker 150 (e.g., Kafka) may be a messaging broker cluster that includes high throughput and lossless publish-subscribe messaging brokers that support the processing of streaming data from the gateway 140 and the processing of error logs from the stores 103.

Platform 152 (e.g., Zookeeper) may provide multiple features for distributed applications, including distributed configuration management, self-election/consensus building, coordination and locks, and key-value store for topics and message brokers. Aggregator pipeline 156 (e.g., Logstash) is an aggregator pipeline that processes, transforms, and sends data to a distributed search and analytics engine 157. Distributed search and analytics engine 157 (e.g., Elasticsearch) may support high-performance querying of store log data. Data visualization tool 315 (e.g., Kibana) may support log analytics, monitoring applications upstream, and business operation use cases. Load Balancer 325 (e.g., Nginx) may support managing and visualizing log analytics data. The data may be provided via dockers 320 (e.g., Kibana dockers) and the docker containers 310.

Figure 4:
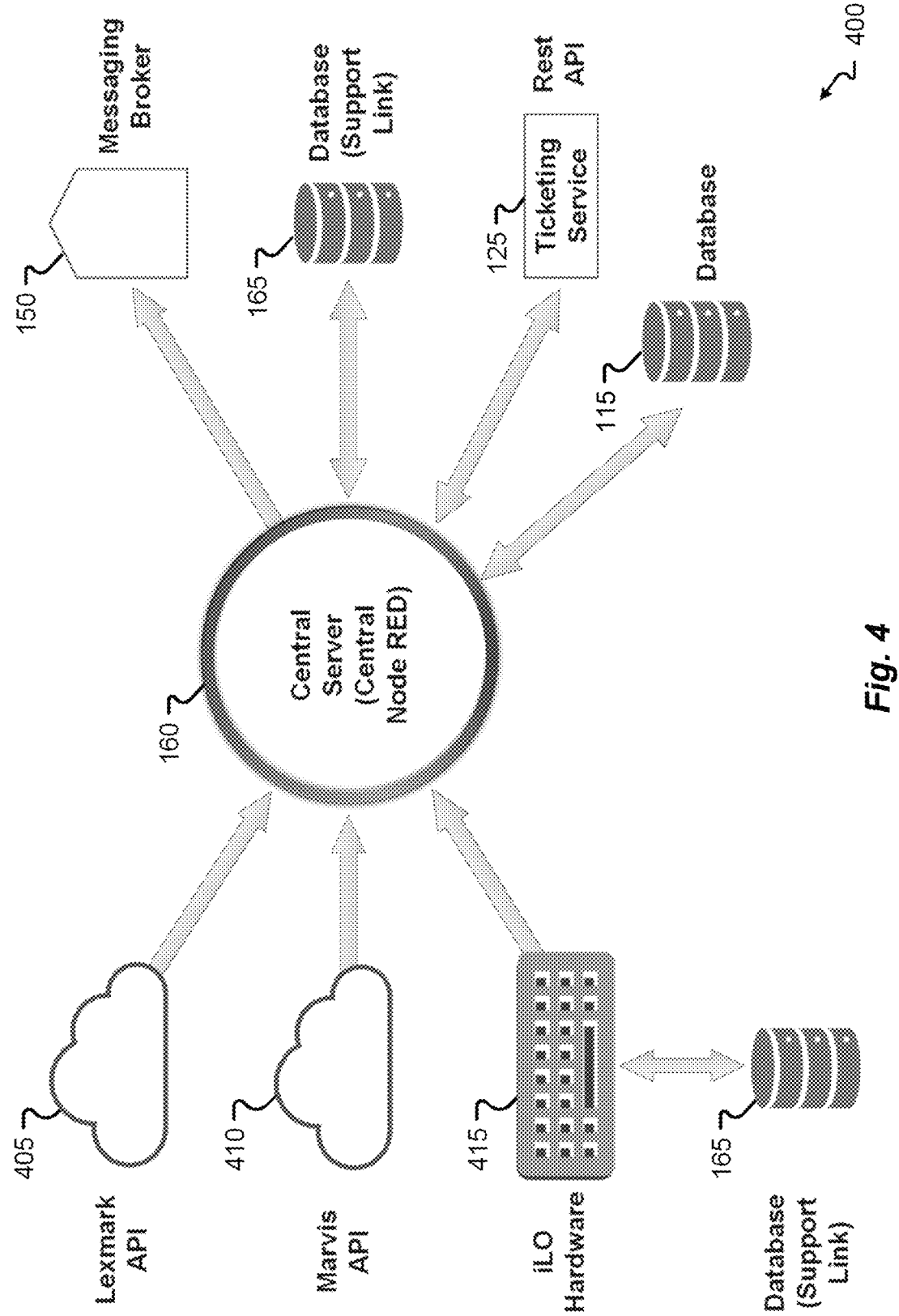
FIG. 4 illustrates an example platform that supports opening a ticket in accordance with aspects of the present disclosure.

FIG. 4 illustrates an example platform 400 that supports opening a ticket (e.g., a service request) (also referred to herein as Node RED ticket opening) in accordance with aspects of the present disclosure. The example platform 400 may be implemented by the system 100 of FIG. 1.

For a given event name within a state machine, the platform 400 may count X events (e.g., where X may be an integer value) over a timeframe or time period. Based on the quantity of the counted events (e.g., if the quantity exceeds a threshold value), the platform 400 may auto-trigger ticket openings via the central server 160 (Central Node RED).

Central messaging queue portal (of Central Node RED) may support communication between database 165 (also referred to herein as support link database), ticketing system 125, and another database (e.g., another database 165, a database 170 (e.g., central Postgres database), etc.).

Lexmark alerts are read from the Lexmark API 405. Automated service tickets to be raised for Lexmark alerts are assigned to FTS. Example error types include FuserFail, Duplexjam, and the like with error codes (e.g., 121.xx, 231.xx, etc.).

The platform 400 may support automation of troubleshooting and support through the use of virtual network assistants (e.g., Marvis virtual network assistant (also referred to herein as Marvis AI)). For example, Marvis alerts are read from the Marvis API 410 (also referred to herein as Mist API). Automated service tickets to be raised for Marvis alerts are assigned to FTS.

iLO hardware 415 may support checking of the database 165 (e.g., external support link database) periodically for new 'Critical' ILO alerts. The central server 160 may pull ILO alerts from database 165 (Support Link central DB) and raise a ServiceNOW ticket through ticketing system 125.

Messaging broker 150 (also referred to herein as a messaging broker cluster) (e.g., Kafka cluster) is a high throughput and lossless publish-subscribe messaging broker that supports the processing streaming data from the gateway 140 and error logs from stores 103. Alerts from central server 160 (Central Node RED) are sent to relevant topics in the messaging broker 150 and used for ELK analysis.

Figure 5:
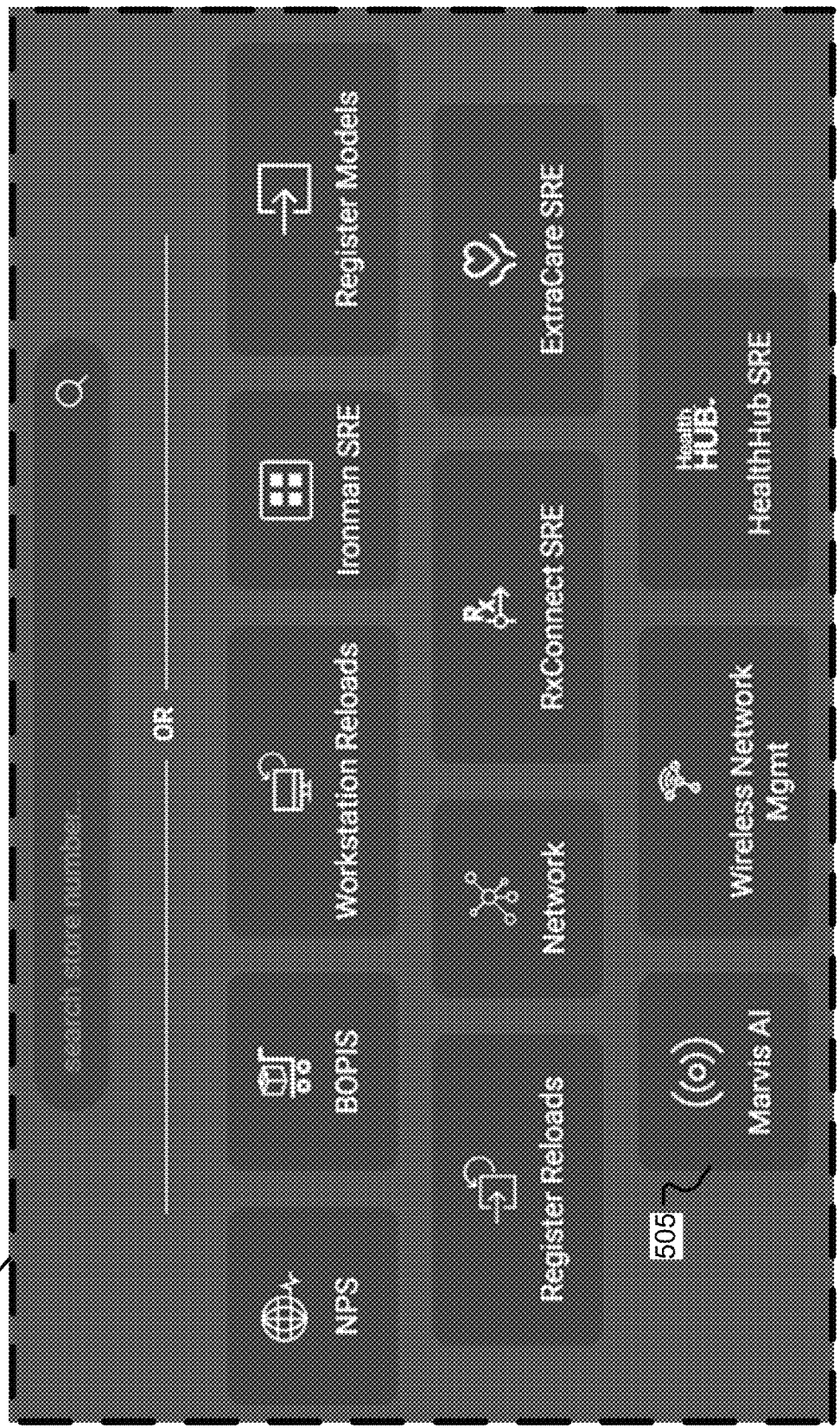
FIG. 5 illustrates an example of a control center in accordance with aspects of the present disclosure.

FIG. 5 illustrates an example of the control center 175 of FIG. 1 in accordance with aspects of the present disclosure. The control center 175 may be implemented, for example, by an application (e.g., browser application, device application) at a computing device (e.g., a device 105) at a remote site 101 or a computing device at central node 102. The control center 175 may include a dashboard 180 as described with reference to FIG. 1. The dashboard 180 may include multiple icons for selecting and implementing features of the control center 175 described herein. Example aspects of AI features supported by aspects of the present disclosure are described with reference to icon 505 ("Marvis AI"). The control center 175 may support user inputs from a user (e.g., associated with an IT team 159, management 176, etc.).

FIGS. 6A and 6B illustrate example user interfaces 600 and 601 in accordance with aspects of the present disclosure. According to example aspects of the present disclosure, a computing device (e.g., a device 105 at a remote site 101, a computing device at central node 102, etc.) may display the user interface 600 via a display device of the computing device, in response to a user selection of the icon 505 ("Marvis AI") via the dashboard 180.

In response to a user selection of icon 505 ("Marvis AI"), the computing device may render user interface 600 via the display device. The user interface 600 may include identifiers 605 respectively corresponding to remote sites 101. In some aspects, the user interface 600 may include ranking information 610 (e.g., ranks) for the remote sites 101. In some examples, the ranking information 610 may be based on the state of health 615 for each remote site 101. For example, the computing device may display the remote sites 101 in an order (e.g., ascending order, descending order, etc.) based on rank and/or state of health. In some examples, the computing device may indicate the respective states of health using a metric value (e.g., a health percentage, etc.) and may indicate rank (e.g., a rank of 1 may have the relatively best health, a rank of 3 may reflect the poorest health among three remote sites 101, etc.).

In response to a user selection of an identifier 605 (e.g., identifier 605-b) corresponding the remote site 101-b, the computing device may render user interface 601 via the display device. In some aspects, via the user interface 601, the computing device may display the state of health 615 of the remote site 101-b and operability statuses 620 contributing to the state of health 615. For example, the operability statuses 620 may include a network status 621 for each remote site 101, device status 622 for each device 105, and environmental condition 623 associated with each remote site 101 as described herein. The state of health 615 may include a calculated health 625 (e.g., as calculated based on operability statuses 620). In some other aspects, the state of health 615 may include predicted future health 630. The predicted future health 630 may be based on predicted failures 635 associated with the remote site 101-b and temporal information 640 associated with the predicted failures 635 as described herein.

Figure 7:
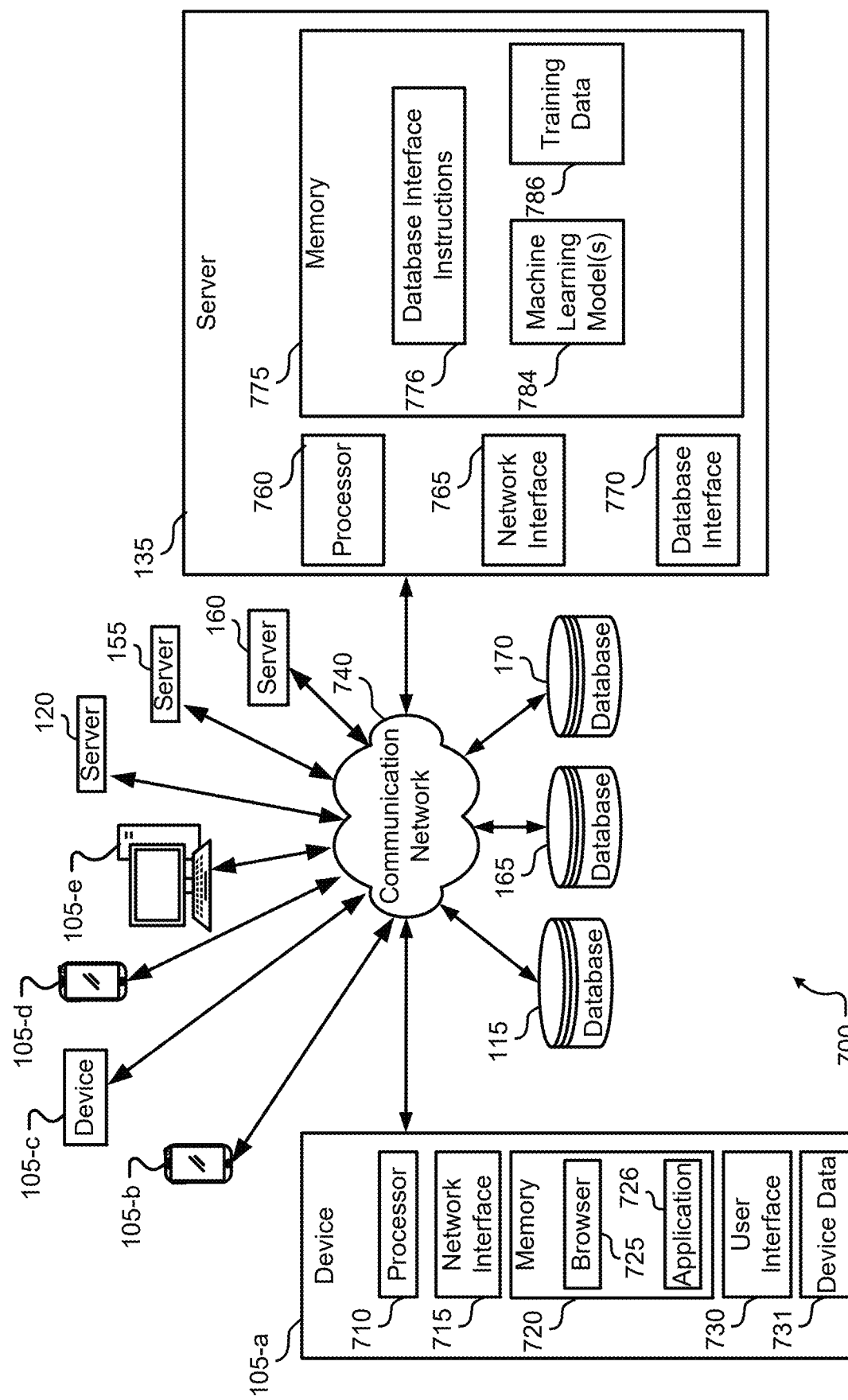
FIG. 7 illustrates an example of a system in accordance with aspects of the present disclosure.

FIG. 7 illustrates another example of the system 700 in accordance with aspects of the present disclosure.

The components of the system 700 may be utilized to facilitate one, some, or all of the methods described herein or portions thereof without departing from the scope of the present disclosure. Furthermore, the servers described herein may include example components or instruction sets, and aspects of the present disclosure are not limited thereto. In an example, a server may be provided with all of the instruction sets and data depicted and described in the server of FIG. 7. Alternatively, or additionally, different servers or multiple servers may be provided with different instruction sets than those depicted in FIG. 7.

The system 700 may include devices 105 (e.g., device 105-a through device 105-e), servers (e.g., server 120, server 135, server 155, server 160, etc.), a communication network 740, and databases (e.g., database 115, database 165, database 170, etc.). The communication network 740 may facilitate machine-to-machine communications between any of the devices 105, servers, or databases. The communication network 740 may include any type of known communication medium or collection of communication media and may use any type of protocols to transport messages between endpoints. The communication network 740 may include wired communications technologies, wireless communications technologies, or any combination thereof.

The Internet is an example of the communication network 740 that constitutes an Internet Protocol (IP) network consisting of multiple computers, computing networks, and other devices located in multiple locations, and components in the communication network 740 (e.g., computers, computing networks, devices) may be connected through one or more telephone systems and other means. Other examples of the communication network 740 may include, without limitation, a standard Plain Old Telephone System (POTS), an Integrated Services Digital Network (ISDN), the Public Switched Telephone Network (PSTN), a Local Area Network (LAN), a Wide Area Network (WAN), a wireless LAN (WLAN), a Session Initiation Protocol (SIP) network, a Voice over Internet Protocol (VOIP) network, a cellular network, and any other type of packet-switched or circuit-switched network known in the art. In some cases, the communication network 740 may include any combination of networks or network types. In some aspects, the communication network 740 may include any combination of communication mediums such as coaxial cable, copper cable/wire, fiber-optic cable, or antennas for communicating data (e.g., transmitting/receiving data).

A device 105 (e.g., device 105-*a*) may include a processor 710, a network interface 715, a computer memory 720, a user interface 730, and device data 731. In some examples, components of the device 105 (e.g., processor 710, network interface 715, computer memory 720, user interface 730) may communicate over a system bus (e.g., control busses, address busses, data busses) included in the device 105. In some cases, the device 105 may be referred to as a computing resource. The device 105 may establish one or more connections with the communication network 740 via the network interface 715. In some cases, the device 105 may transmit or receive packets to one or more other devices (e.g., another device 105, a server, a database, etc.) via the communication network 740.

Non-limiting examples of the device 105 may include, for example, personal computing devices or mobile computing devices (e.g., laptop computers, mobile phones, smart phones, smart devices, wearable devices, tablets, etc.). In some examples, the device 105 may be operable by or carried by a human user. In some aspects, the device 105 may perform one or more operations autonomously or in combination with an input by the user.

The device 105 may support communications between multiple entities (e.g., users). In some cases, the system 700 may include any number of devices 105, and each of the devices 105 may be associated with a respective entity.

The device 105 may render or output any combination of notifications, messages, data, menus, etc. based on data communications transmitted or received by the device 105 over the communication network 740. For example, the device 105 may receive one or more electronic communications (e.g., from a server) via the communication network 740. Additionally, or alternatively, the system 700 may support communications of any electronic communications between any device of the system 700, and the electronic communications may include any combination of transmitted or received data as described herein.

In some aspects, the device 105 may render a presentation (e.g., visually, audibly, using haptic feedback, etc.) of the electronic communication via the user interface 730. The user interface 730 may include, for example, a display, an audio output device (e.g., a speaker, a headphone connector), or any combination thereof. In some aspects, the device 105 may render a presentation using one or more applications (e.g., a browser application 725) stored on the memory 720. In an example, the browser application 725 may be configured to receive the electronic communication in an electronic format (e.g., in an electronic communication via the communication network 740) and present content of the electronic communication via the user interface 730.

In some aspects, a device 105 and/or the servers (e.g., server 120, server 135, server 155, server 160, etc.) may receive and/or access electronic records or datasets from any of the databases (e.g., database 115, database 165, database 170, etc.). In some other aspects, the electronic records may include device data 731 obtained from any device 105 (e.g., device 105-*a*, device 105-*b*, etc.).

In accordance with aspects of the present disclosure, the device data 731 may be provided continuously, semi-continuously, periodically, and/or based on a trigger condition by the device 105. Aspects of the present disclosure support processing data accessed from any of the data sources (e.g., databases, devices, etc.) described herein exclusively or in combination.

Example aspects are described herein with reference to the servers (e.g., server 120, server 135, server 155, server 160, etc.). The aspects described herein with reference to the example server 135 may be implemented by other servers (e.g., server 120, server 155, server 160, etc.) described herein. In an example, the server 135 may include a processor 760, a network interface 765, a database interface 770, and a memory 775. In some examples, components of the server 135 (e.g., processor 760, a network interface 765, a database interface 770, and a memory 775) may communicate via a system bus (e.g., any combination of control busses, address busses, and data busses) included in the server 135.

Aspects of the processor 760, network interface 765, database interface 770, and memory 775 may support example functions of the server 135 as described herein. For example, the server 135 may transmit packets to (or receive packets from) one or more other devices (e.g., one or more devices 105, another server, a database, etc.) via the communication network 740. In some aspects, via the network interface 765, the server 135 may transmit database queries to one or more databases of the system 700, receive responses associated with the database queries, or access data associated with the database queries.

In some aspects, via the network interface 765, the server 135 may transmit one or more electronic communications described herein to one or more devices 105 or servers of the system 700. The network interface 765 may include, for example, any combination of network interface cards (NICs), network ports, associated drivers, or the like. Communications between components (e.g., processor 760, network interface 765, database interface 770, and memory 775) of the server 135 and other devices (e.g., one or more devices 105, a database, another server, etc.) connected to the communication network 740 may, for example, flow through the network interface 765.

The processors described herein (e.g., processor 710 of the device 105, processor 760 of the server 135) may correspond to one or many computer processing devices. For example, the processors may include a silicon chip, such as a Field Programmable Gate Array (FPGA), an Application-Specific Integrated Circuit (ASIC), any other type of Integrated Circuit (IC) chip, a collection of IC chips, or the like. In some aspects, the processors may include a microprocessor, a Central Processing Unit (CPU), a Graphics Processing Unit (GPU), or plurality of microprocessors configured to execute the instructions sets stored in a corresponding memory (e.g., memory 720 of the device 105, memory 775 of the server 135). For example, upon executing the instruction sets stored in memory 720, the processor 710 may enable or perform one or more functions of the device 105. In another example, upon executing the instruction sets stored in memory 775, the processor 760 may enable or perform one or more functions of the server 135.

The processors described herein (e.g., processor 710 of the device 105, processor 760 of the server 135) may utilize data stored in a corresponding memory (e.g., memory 720 of the device 105, memory 775 of the server 135) as a neural network. The neural network may include a machine learning architecture. In some aspects, the neural network may be or include one or more classifiers. In some other aspects, the neural network may be or include any machine learning network such as, for example, a deep learning network, a convolutional neural network, or the like. Some elements stored in memory 720 may be described as or referred to as instructions or instruction sets, and some functions of the device 105 may be implemented using machine learning techniques. In another example, some elements stored in memory 775 may be described as or referred to as instructions or instruction sets, and some functions of the server 135 may be implemented using machine learning techniques.

In some aspects, the processors (e.g., processor 710, processor 760) may support machine learning model(s) 784 which may be trained and/or updated based on data (e.g., training data 786) provided or accessed by any of the device 105, servers, and the databases. The machine learning model(s) 784 may be built and updated by any of the engines described herein (e.g., prediction engine 783) based on the training data 786 (also referred to herein as training data and feedback).

In some aspects, the training data 786 may include multiple training sets. In some other examples, aspects of the present disclosure include creating a training set based on data included in any of the training sets described herein.

In some aspects, training the machine learning model(s) 784 may be based on a target prediction accuracy of the machine learning model(s) 784. In some examples, training the machine learning model(s) 784 and prediction using the machine learning model(s) 784 may be implemented using GPU enabled edge nodes (e.g., at a device 105, at the server 135, etc.).

The machine learning model(s) 784 may be provided in any number of formats or forms. Example aspects of the machine learning model(s) 784, such as generating (e.g., building, training) and applying the machine learning model(s) 784, are described with reference to the figure descriptions herein.

Non-limiting examples of the machine learning model(s) 784 include Decision Trees, gradient-boosted decision tree approaches (GBMs), Support Vector Machines (SVMs), Nearest Neighbor, and/or Bayesian classifiers, and neural-network-based approaches.

In some aspects, the machine learning model(s) 784 may include ensemble classification models (also referred to herein as ensemble methods) such as gradient boosting machines (GBMs). Gradient boosting techniques may include, for example, the generation of decision trees one at a time within a model, where each new tree may support the correction of errors generated by a previously trained decision tree (e.g., forward learning). Gradient boosting techniques may support, for example, the construction of ranking models for information retrieval systems. A GBM may include decision tree-based ensemble algorithms that support building and optimizing models in a stage-wise manner.

According to example aspects of the present disclosure described herein, the machine learning model(s) 784 may include Gradient Boosting Decision Trees (GBDTs). Gradient boosting is a supervised learning technique that harnesses additive training and tree boosting to correct errors made by previous models, or regression trees. The machine learning model(s) 784 may include extreme gradient boosting (CatBoost) models.

In some aspects, the machine learning model(s) 784 may include ensemble classification models (also referred to herein as ensemble methods) such as random forests. Random forest techniques may include independent training of each decision tree within a model, using a random sample of data.

Various example aspects of the machine learning model(s) 784, inputs to the machine learning model(s) 784, and the training data 786 with respect to the present disclosure are described here.

The memory described herein (e.g., memory 720, memory 775) may include any type of computer memory device or collection of computer memory devices. For example, a memory (e.g., memory 720, memory 775) may include a Random Access Memory (RAM), a Read Only a Memory (ROM), a flash memory, an Electronically-Erasable Programmable ROM (EEPROM), Dynamic RAM (DRAM), or any combination thereof.

The memory described herein (e.g., memory 720, memory 775) may be configured to store instruction sets, neural networks, and other data structures (e.g., depicted herein) in addition to temporarily storing data for a respective processor (e.g., processor 710, processor 760) to execute various types of routines or functions. For example, the memory 775 may be configured to store program instructions (instruction sets) that are executable by the processor 760 and provide functionality of any of the engines described herein.

The memory described herein (e.g., memory 720, memory 775) may also be configured to store data or information that is useable or capable of being called by the instructions stored in memory. Examples of data that may be stored in memory 775 for use by components thereof include machine learning model(s) 784 and/or training data 786 described herein.

Any of the engines described herein may include a single or multiple engines.

With reference to the server 135, the memory 775 may be configured to store instruction sets, neural networks, and other data structures (e.g., depicted herein) in addition to temporarily storing data for the processor 760 to execute various types of routines or functions.

The illustrative data or instruction sets that may be stored in memory 775 may include, for example, database interface instructions 776.

In some examples, the database interface instructions 776, when executed by the processor 760, may enable the server 135 to send data to and receive data from the databases 745. For example, the database interface instructions 776, when executed by the processor 760, may enable the server 135 to generate database queries, provide one or more interfaces for system administrators to define database queries, transmit database queries to one or more databases 745, receive responses to database queries, access data associated with the database queries, and format responses received from the databases for processing by other components of the server 135.

Figure 8:
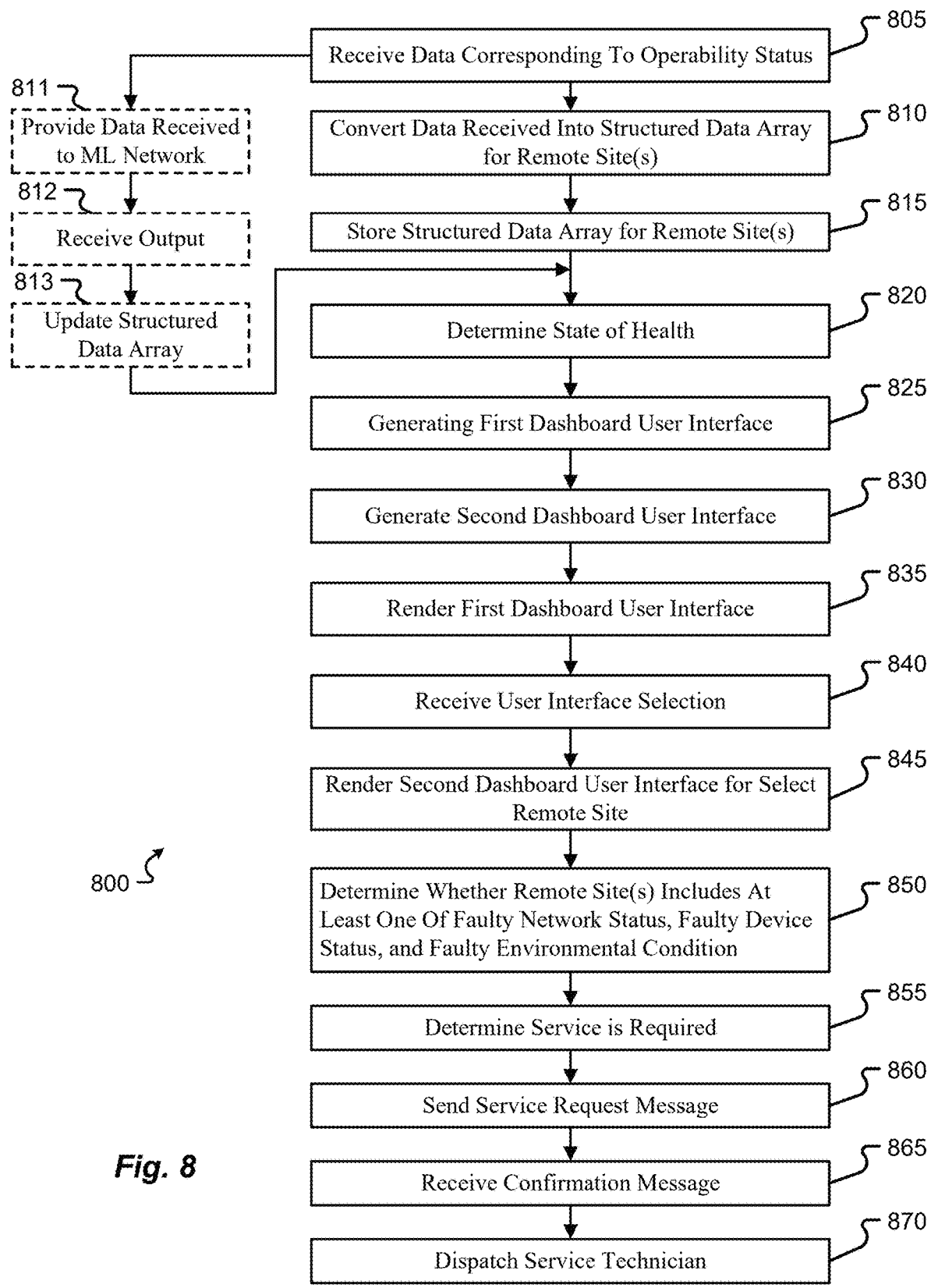
FIG. 8 illustrates an example process flow in accordance with aspects of the present disclosure.

FIG. 8 illustrates an example of a process flow 800 that supports healing remote site devices based on monitored health metrics in accordance with aspects of the present disclosure. In some examples, process flow 800 may be implemented by the system 100 of FIG. 1.

In the following description of the process flow 800, the operations may be performed in a different order than the order shown, or the operations may be performed in different orders or at different times. Certain operations may also be left out of the process flow 800, or other operations may be added to the process flow 800.

In some aspects, the process flow 800 may be implemented by a server, including: a processor; and a memory coupled with and readable by the processor and storing therein instructions that, when executed by the processor, cause the processor to implement aspects of the process flow 800.

In some other aspects, the process flow 800 may be implemented by a system, including: a communications interface; a processor coupled with the communications interface; and a memory coupled with the processor, wherein the memory stores data that, when executed by the processor, enables the processor to implement aspects of the process flow 800.

At 805, the process flow 800 may include receiving, from a plurality of remote sites, data corresponding to an operability status for each remote site of the plurality of remote sites, wherein the operability status includes a network status for each remote site of the plurality of remote sites, a device status for at least one device at each remote site, and an environmental condition associated with each remote site.

In some aspects, the data is received from the plurality of remote sites simultaneously and in real time. In some aspects, the data includes error log information and event message information from the at least one device at each remote site.

At 810, the process flow 800 may include converting the data received into a structured data array for each remote site, wherein the structured data array includes the data received arranged by a name-specific format that identifies whether the data is associated with the network status, the device status, and the environmental condition.

At 815, the process flow 800 may include storing, in a memory storage device, the structured data array for each remote site into a respective group storage location.

At 820, the process flow 800 may include determining, based on the structured data array, a state of health for each remote site. In some aspects, the state of health includes an operability of the at least one device at each remote site over time.

At 825, the process flow 800 may include generating a first dashboard user interface including site identifiers representing each remote site of the plurality of remote sites and the state of health for each remote site.

At 830, the process flow 800 may include generating a second dashboard user interface for each remote site including discrete user interface icons for each of the network status, the device status, and the environmental condition for each remote site.

At 835, the process flow 800 may include rendering, via a display device, the first dashboard user interface including the site identifiers.

At 840, the process flow 800 may include receiving, via a user interface device, a user interface selection of a select identifier of the site identifiers corresponding to a select remote site of the plurality of remote sites.

At 845, the process flow 800 may include rendering, via the display device in response to receiving the user interface selection, the second dashboard user interface for the select remote site of the plurality of remote sites.

At 850, the process flow 800 may include determining, based on the state of health for each remote site, whether at least one remote site includes at least one of a faulty network status including a network transmission status that falls below a predetermined transmission value, a faulty device status including a device operation statistic that falls below a predetermined operation value, and a faulty environmental condition including an environmental status that falls outside of a predetermined environmental range.

In some aspects, the at least one of the faulty network status, faulty device status, and the faulty environmental condition corresponds to a predictive trigger for a failure of at least one remote site before the failure occurs.

At 855, the process flow 800 may include determining, based on the state of health for a particular remote site of the plurality of remote sites, a service is required for the at least one device at the particular remote site.

At 860, the process flow 800 may include sending, across a communication network, a service request message to a service server.

At 865, the process flow 800 may include receiving, from the service server, a confirmation message that the service request message is received and that a service ticket is created for the at least one device at the particular remote site.

At 870, the process flow 800 may include dispatching, in response to receiving the confirmation message, a service technician to the particular remote site within a predetermined time limit.

Aspects of the process flow 800 support machine learning.

For example, at 811, the process flow 800 may include providing the data received to a machine learning network.

At 812, the process flow 800 may include receiving an output from the machine learning network in response to the machine learning network processing at least a portion of the data received.

In an example, the output from the machine learning network includes at least one of: a predicted network status for at least one remote site of the plurality of remote sites; a predicted device status for at least one device at the at least one remote site; a predicted environmental condition associated with the at least one remote site; and a predicted operability status for the at least one remote site. In another example, the output from the machine learning network includes: a predicted failure associated with a remote site of the plurality of remote sites; and a failure point associated with the predicted failure and the remote site.

At 813, the process flow 800 may include updating the structured data array based on data included in the output from the machine learning network. In an example, determining the state of health for each remote site at 820 is based on updating the structured data array.

A number of implementations have been described. Nevertheless, it will be understood that additional modifications may be made without departing from the scope of the inventive concepts described herein, and, accordingly, other examples are within the scope of the following claims.

The exemplary systems and methods of this disclosure have been described in relation to examples of a system 100, a device 105, and a server 135. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the examples illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed examples, configuration, and aspects.

A number of variations and modifications of the disclosure can be used. It would be possible to provide for some features of the disclosure without providing others.

In yet another example, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another examples, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another example, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the examples with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein, may be periodically superseded by faster or more effective equivalents having essentially the same functions. Such replacement standards and protocols having the same functions are considered equivalents included in the present disclosure.

The present disclosure, in various examples, configurations, and aspects, includes components, methods, processes, systems and/or apparatus substantially as depicted and described herein, including various examples, subcombinations, and subsets thereof. Those of skill in the art will understand how to make and use the systems and methods disclosed herein after understanding the present disclosure. The present disclosure, in various examples, configurations, and aspects, includes providing devices and processes in the absence of items not depicted and/or described herein or in various examples, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more examples, configurations, or aspects for the purpose of streamlining the disclosure. The features of the examples, configurations, or aspects of the disclosure may be combined in alternate examples, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed example, configuration, or aspect. Thus, the following claims are hereby incorporated into this Detailed Description, with each claim standing on its own as a separate preferred example of the disclosure.

Moreover, though the description of the disclosure has included description of one or more examples, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative examples, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an example that is entirely hardware, an example that is entirely software (including firmware, resident software, microcode, etc.) or an example combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably, and include any type of methodology, process, mathematical operation, or technique.

What is claimed is:

1. A server, comprising:
a processor; and
a memory coupled with and readable by the processor and storing therein instructions that, when executed by the processor, cause the processor to:
  receive, from a plurality of remote sites, data corresponding to an operability status for each remote site of the plurality of remote sites, wherein the operability status comprises a network status for each remote site of the plurality of remote sites, a device status for at least one device at each remote site, and an environmental condition associated with each remote site;
  convert the data received into a structured data array for each remote site, wherein the structured data array comprises the data received arranged by a name-specific format that identifies whether the data is associated with the network status, the device status, and the environmental condition;
  store, in a memory storage device, the structured data array for each remote site into a respective group storage location;
  determine, based on the structured data array, a state of health for each remote site;
  generate a first dashboard user interface comprising site identifiers representing each remote site of the plurality of remote sites and the state of health for each remote site;
  generate a second dashboard user interface for each remote site comprising discrete user interface icons for each of the network status, the device status, and the environmental condition for each remote site;
  render, via a display device, the first dashboard user interface comprising the site identifiers;
  receive, via a user interface device, a user interface selection of a select identifier of the site identifiers corresponding to a select remote site of the plurality of remote sites; and
  render, via the display device in response to receiving the user interface selection, the second dashboard user interface for the select remote site of the plurality of remote sites.

2. The server of claim 1, wherein the instructions that, when executed by the processor, further cause the processor to:
  determine, based on the state of health for a particular remote site of the plurality of remote sites, a service is required for the at least one device at the particular remote site;
  send, across a communication network, a service request message to a service server; and receive, from the service server, a confirmation message that the service request message is received and that a service ticket is created for the at least one device at the particular remote site.

3. The server of claim 2, wherein the instructions that, when executed by the processor, further cause the processor to:
dispatch, in response to receiving the confirmation message, a service technician to the particular remote site within a predetermined time limit.

4. The server of claim 1, wherein the data is received from the plurality of remote sites simultaneously and in real time.

5. The server of claim 1, wherein the data comprises error log information and event message information from the at least one device at each remote site.

6. The server of claim 1, wherein the state of health comprises an operability of the at least one device at each remote site over time.

7. The server of claim 1, wherein the instructions that, when executed by the processor, further cause the processor to:
determine, based on the state of health for each remote site, whether at least one remote site comprises at least one of a faulty network status comprising a network transmission status that falls below a predetermined transmission value, a faulty device status comprising a device operation statistic that falls below a predetermined operation value, and a faulty environmental condition comprising an environmental status that falls outside of a predetermined environmental range.

8. The server of claim 7, wherein the at least one of the faulty network status, faulty device status, and the faulty environmental condition corresponds to a predictive trigger for a failure of at least one remote site before the failure occurs.

9. The server of claim 1, wherein the instructions that, when executed by the processor, further cause the processor to:
provide the data received to a machine learning network;
receive an output from the machine learning network in response to the machine learning network processing at least a portion of the data received; and
update the structured data array based at least in part on data comprised in the output from the machine learning network,
wherein determining the state of health for each remote site is based on updating the structured data array.

10. The server of claim 9, wherein the output from the machine learning network comprises at least one of:
a predicted network status for at least one remote site of the plurality of remote sites;
a predicted device status for at least one device at the at least one remote site;
a predicted environmental condition associated with the at least one remote site; and
a predicted operability status for the at least one remote site.

11. The server of claim 9, wherein the output from the machine learning network comprises:
a predicted failure associated with a remote site of the plurality of remote sites; and
a failure point associated with the predicted failure and the remote site.

12. A system, comprising:
a communications interface;
a processor coupled with the communications interface; and
a memory coupled with the processor, wherein the memory stores data that, when executed by the processor, enables the processor to:
receive, from a plurality of remote sites, data corresponding to an operability status for each remote site of the plurality of remote sites, wherein the operability status comprises a network status for each remote site of the plurality of remote sites, a device status for at least one device at each remote site, and an environmental condition associated with each remote site;
convert the data received into a structured data array for each remote site, wherein the structured data array comprises the data received arranged by a name-specific format that identifies whether the data is associated with the network status, the device status, and the environmental condition;
store, in a memory storage device, the structured data array for each remote site into a respective group storage location;
determine, based on the structured data array, a state of health for each remote site;
generate a first dashboard user interface for each remote site comprising site identifiers representing each remote site of the plurality of remote sites and the state of health for each remote site;
generate a second dashboard user interface comprising discrete user interface icons for each of the network status, the device status, and the environmental condition for each remote site;
render, via a display device, the first dashboard user interface comprising the site identifiers;
receive, via a user interface device, a user interface selection of a select identifier of the site identifiers corresponding to a select remote site of the plurality of remote sites; and
render, via the display device in response to receiving the user interface selection, the second dashboard user interface for the select remote site of the plurality of remote sites.

13. The system of claim 12, wherein the data that, when executed by the processor, further cause the processor to:
determine, based on the state of health for a particular remote site of the plurality of remote sites, a service is required for the at least one device at the particular remote site;
send, across a communication network, a service request message to a service server; and
receive, from the service server, a confirmation message that the service request message is received and that a service ticket is created for the at least one device at the particular remote site.

14. The system of claim 13, wherein the data that, when executed by the processor, further cause the processor to:
dispatch, in response to receiving the confirmation message, a service technician to the particular remote site within a predetermined time limit.

15. The system of claim 12, wherein:
the data comprises error log information and event message information from the at least one device at each remote site; and
the state of health comprises an operability of the at least one device at each remote site over time.

16. The system of claim 12, wherein the data that, when executed by the processor, further cause the processor to:
determine, based on the state of health for each remote site, whether at least one remote site comprises at least one of a faulty network status comprising a network transmission status that falls below a predetermined transmission value, a faulty device status comprising a device operation statistic that falls below a predetermined operation value, and a faulty environmental condition comprising an environmental status that falls outside of a predetermined environmental range.

17. The system of claim 12, wherein the data that, when executed by the processor, further cause the processor to:
provide the data received to a machine learning network;
receive an output from the machine learning network in response to the machine learning network processing at least a portion of the data received; and
update the structured data array based at least in part on data comprised in the output from the machine learning network,
wherein determining the state of health for each remote site is based on updating the structured data array.

18. A method comprising:
receiving, from a plurality of remote sites, data corresponding to an operability status for each remote site of the plurality of remote sites, wherein the operability status comprises a network status for each remote site of the plurality of remote sites, a device status for at least one device at each remote site, and an environmental condition associated with each remote site;
converting the data received into a structured data array for each remote site, wherein the structured data array comprises the data received arranged by a name-specific format that identifies whether the data is associated with the network status, the device status, and the environmental condition;
storing, in a memory storage device, the structured data array for each remote site into a respective group storage location;
determining, based on the structured data array, a state of health for each remote site;
generating a first dashboard user interface comprising site identifiers representing each remote site of the plurality of remote sites and the state of health for each remote site;
generating a second dashboard user interface for each remote site comprising discrete user interface icons for each of the network status, the device status, and the environmental condition for each remote site;
rendering, via a display device, the first dashboard user interface comprising the site identifiers;
receiving, via a user interface device, a user interface selection of a select identifier of the site identifiers corresponding to a select remote site of the plurality of remote sites; and
rendering, via the display device in response to receiving the user interface selection, the second dashboard user interface for the select remote site of the plurality of remote sites.

19. The method of claim 18, further comprising:
determining, based on the state of health for a particular remote site of the plurality of remote sites, a service is required for the at least one device at the particular remote site;
sending, across a communication network, a service request message to a service server; and
receiving, from the service server, a confirmation message that the service request message is received and that a service ticket is created for the at least one device at the particular remote site.

20. The method of claim 19, further comprising:
determining, based on the state of health for each remote site, whether at least one remote site comprises at least one of a faulty network status comprising a network transmission status that falls below a predetermined transmission value, a faulty device status comprising a device operation statistic that falls below a predetermined operation value, and a faulty environmental condition comprising an environmental status that falls outside of a predetermined environmental range.

* * * * *